A. V. MAEDJE.
PROTECTOR FOR AUTOMOBILE RADIATORS.
APPLICATION FILED MAR. 4, 1912.
1,069,154. Patented Aug. 5, 1913.
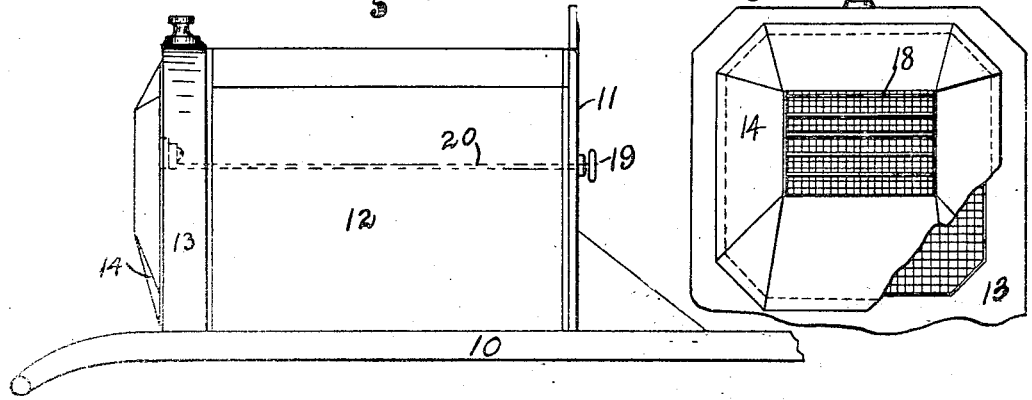
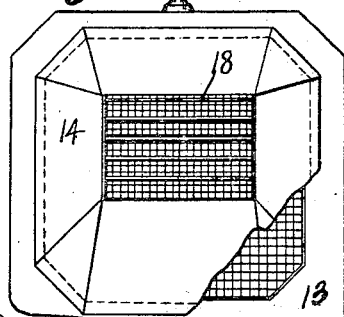
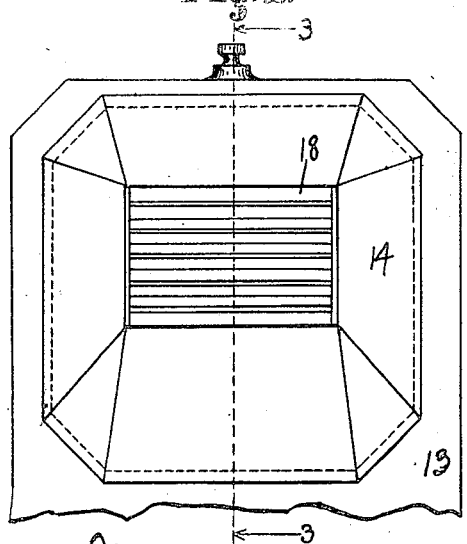
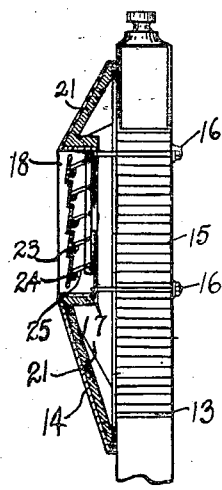
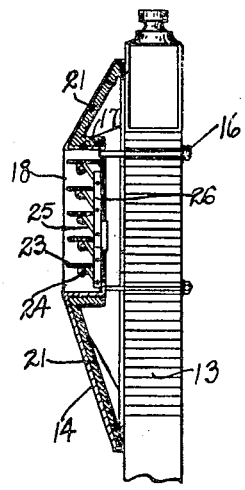
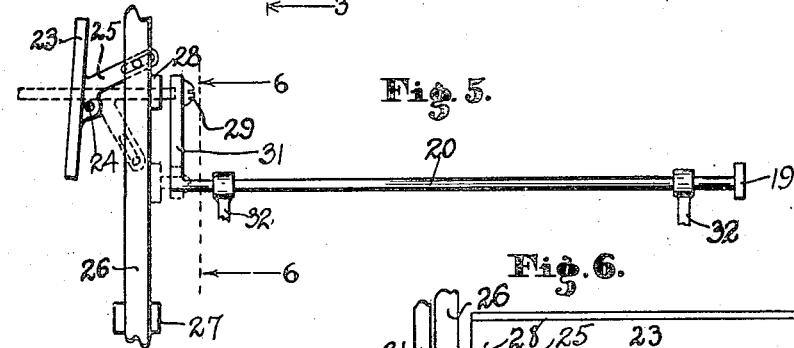
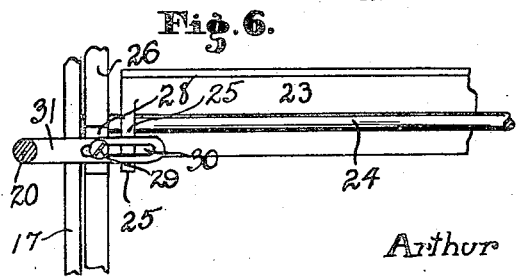
WITNESSES:
INVENTOR.
Arthur V. Maedje.
BY
ATTORNEY.

UNITED STATES PATENT OFFICE.

ARTHUR V. MAEDJE, OF INDIANAPOLIS, INDIANA, ASSIGNOR OF ONE-THIRD TO VIRGIL H. LOCKWOOD, OF INDIANAPOLIS, INDIANA.

PROTECTOR FOR AUTOMOBILE-RADIATORS.

1,069,154.   Specification of Letters Patent.   Patented Aug. 5, 1913.

Application filed March 4, 1912. Serial No. 681,405.

*To all whom it may concern:*

Be it known that I, ARTHUR V. MAEDJE, a citizen of the United States, and a resident of Indianapolis, county of Marion, and State of Indiana, have invented a certain useful Protector for Automobile-Radiators; and I do hereby declare that the following is a full, clear, and exact description thereof, reference being had to the accompanying drawings.

The object of this invention is to provide an improved radiator shield for use in connection with a radiator or water cooler of a water-cooled engine, by which the cooler portions of the radiator shall at all times be protected against freezing during cold weather, and all of the radiator may be shielded when the engine is stopped.

The chief feature of the invention lies in the provision of a shutter in the upper part of a radiator shield in front of the warmest part of the radiator and which may be opened when the engine is running, whereby cold air will be allowed to come into contact with only the warmest parts of the radiator, and the water within the cooler parts of the radiator may be protected and kept from freezing, and when the engine is not running, the shield may be entirely closed to maintain the radiator in a warm condition.

The nature of the invention will be understood from the following description and claims and the accompanying drawings.

In the drawings, Figure 1 is a side elevation of a portion of the front end of an automobile with my invention installed thereon for the purpose of protecting the radiator. Fig. 2 is a front elevation of a portion of the same. Fig. 3 is a vertical transverse section on the line 3—3 of Fig. 2 with the shutter shown in a closed position. Fig. 4 shows the same as Fig. 3, but with the shutter open. Fig. 5 shows in detail the means for operating the plates of the shutter. Fig. 6 is a section on the line 6—6 of Fig. 5. Fig. 7 front elevation of the shield with parts broken away, showing the radiator underneath.

In detail, there is shown in the drawings the front portion of an automobile having a chassis 10, dash 11, hood 12 for covering the engine and a water cooler or radiator 13 with a shield 14 secured to the front end thereof to prevent the water therein from freezing.

As shown in Figs. 2 and 3, a shield 14 of such shape as to entirely cover the tubes 15 of the radiator 13 is secured to the radiator by means of bolts 16 from the inwardly extending flange 17 and extending between the tubes of the radiator. In the upper portion of the shield and within the flange 17 where is an opening 18, which lies opposite what is normally the warmest part of the radiator, and within the opening a suitable shutter construction is used by which said opening may be closed, and this shutter is operated by turning the knob 19 upon the end of the rod 20 extending through the dash 11. Preferably, the shield 14 is made of metal, although this is not essential, and against the inner side of the shield there is a sheet 21 of some suitable heat insulating material, such as felt. This insulation also surrounds the flanges 17 and extends almost to the face of the radiator.

The shutter within the opening 18 is formed of a number of plates 23, which are pivoted upon rods 24 secured in the flange 17 and extending across the opening 18. Said plates may be secured in any desired manner within the opening 18. At one end and upon the rear side of each of the shutter plates 23 and preferably above the pivot rod 24, there are slotted rearward arms 25, which are loosely pivoted to a vertical shift bar 26. Said shift bar is allowed to reciprocate in a vertical direction between guide lugs 27 secured to the flange 17. Upon the rear side of said shift bar a block 28 is secured, into which a screw 29 is threaded, said screw extending through a slot 30 in the bent end 31 of the operating rod 20, which extends through the dash 11 and has the knob 19 secured upon its outer end, as heretofore mentioned. Said rod 20 may be mounted in any desired manner, here shown as having bearings 32 in projections from the engine, not shown.

The operation of the invention will be readily understood.

During the cold winter months the shield 14 with the inner sheet 21 of insulating material, is secured upon the radiator by means of the bolts 16. The opening 18 through the shield 14 is of such design that practically only one-sixth of the radiator surface is exposed to the cold outer air when the shield is installed upon the radiator, and this opening being opposite the normally warmest parts of the radiator, the lower parts thereof, in which the water is coolest, will be protected and kept from freezing, not only while the engine is running, but while it is stopped. When it is desired to use the machine, except in the very coldest weather, the knob 19 upon the rod 20 is so turned as to bring the shutter plates 23 to the dotted line position shown in Fig. 5, and allow the cold air to pass through the opening 18 and cool the water within the radiator 13. In extremely cold weather, or when it is desired to stop the machine and leave it in an exposed position for some time, the knob 19 is turned to bring the plates 23 to the substantially vertical position, as shown in Fig. 3, and close the opening 18 to prevent the water within the radiator from being chilled to the freezing point or below with consequent injury to the tubes of the radiator.

I claim as my invention:

1. A shield adapted to be removably secured over the front of a radiator for an internal combustion engine having an opening therethrough opposite the upper portion of the radiator, and an annular inwardly extending flange surrounding said opening, a series of shutters oscillatably mounted in said opening and flange, and means for simultaneously opening and closing the same.

2. The combination with a radiator for an internal combustion engine, of a shield adapted to cover the front thereof the central portion of said shield being spaced forward from the radiator and the lateral portions sloping to the radiator and an opening being provided in the upper portion of the shield, an annular flange surrounding said opening and projecting inwardly from the shield, shutters in said opening for closing the same, means for opening and closing said shutters, refractory material located between the radiator and said shield excepting the opening therethrough, and means for detachably securing the shield to the radiator.

3. The combination with the chassis of an automobile, a dash board, and a radiator thereon, of a shield detachably secured to the radiator and covering the front thereof and having an opening in front thereof, shutters for closing said opening, rocking bars on which said shutters are pivoted, a crank arm connected with said rocking bars, a rod extending from said shutters through the dash board, an arm on the forward end of the rod operatively engaging said crank arm, and means on the rear end thereof for oscillating said rod whereby the shutter can be opened and closed.

In witness whereof, I have hereunto affixed my signature in the presence of the witnesses herein named.

ARTHUR V. MAEDJE.

Witnesses:
G. H. BOINK,
O. M. McLAUGHLIN.